(12) United States Patent
Matsui et al.

(10) Patent No.: US 9,180,878 B2
(45) Date of Patent: Nov. 10, 2015

(54) CONTROL DEVICE FOR HYBRID VEHICLE

(75) Inventors: Hiroki Matsui, Ebina (JP); Hiroki Shimoyama, Yokohama (JP); Yutaka Takamura, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 79 days.

(21) Appl. No.: 14/354,277

(22) PCT Filed: Aug. 23, 2012

(86) PCT No.: PCT/JP2012/071276
§ 371 (c)(1),
(2), (4) Date: Jun. 26, 2014

(87) PCT Pub. No.: WO2013/061678
PCT Pub. Date: May 2, 2013

(65) Prior Publication Data
US 2015/0051766 A1 Feb. 19, 2015

(30) Foreign Application Priority Data
Oct. 28, 2011 (JP) .................. 2011-237009

(51) Int. Cl.
*B60T 1/00* (2006.01)
*B60T 7/00* (2006.01)
(Continued)

(52) U.S. Cl.
CPC ................ *B60W 20/40* (2013.01); *B60K 6/48* (2013.01); *B60K 6/547* (2013.01); *B60L 11/14* (2013.01); *B60W 10/02* (2013.01); *B60W 10/08* (2013.01); *B60W 10/115* (2013.01); *B60W 30/18027* (2013.01); *B60K 2006/4825* (2013.01);
(Continued)

(58) Field of Classification Search
CPC ..... B60W 20/40; B60W 10/02; B60W 10/08; B60W 10/115; B60W 30/18027; B60W 2510/1055; B60W 2710/025; B60W 2710/0672; B60W 2710/085; B60K 6/48; B60K 6/547; B60K 2006/4825; Y02T 10/6221; Y02T 10/6252; Y02T 10/7077; Y02T 10/70; B60Y 2300/429; B60L 11/14; Y10S 903/93
See application file for complete search history.

(56) References Cited

U.S. PATENT DOCUMENTS

2006/0017414 A1* 1/2006 Joe .................. B60K 6/445
318/432
2007/0080005 A1* 4/2007 Joe .................. B60K 6/48
180/65.245
(Continued)

FOREIGN PATENT DOCUMENTS

JP 2007-126091 A 5/2007
JP 2010-30486 A 2/2010
(Continued)

*Primary Examiner* — Mary Cheung
(74) *Attorney, Agent, or Firm* — Global IP Counselors, LLP

(57) ABSTRACT

A hybrid vehicle control device basically includes an engine, a motor/generator, a first clutch, a second clutch and an engine start control section. The first clutch is disposed between the engine and the motor/generator. The second clutch is disposed between the motor/generator and a drive wheel. The engine start control section has a second clutch slip transition control section that is configured to control a transition of the second clutch to slip engagement when an engine start control is begun based on a mode transition request resulting from an accelerator depression operation, by increasing the torque transmission capacity of the second clutch according to a prescribed slope after dropping the torque transmission capacity of the second clutch to a value smaller than a target drive force.

13 Claims, 11 Drawing Sheets

(51) Int. Cl.
  *B60W 20/00* (2006.01)
  *B60K 6/48* (2007.10)
  *B60K 6/547* (2007.10)
  *B60W 10/02* (2006.01)
  *B60W 10/08* (2006.01)
  *B60W 10/115* (2012.01)
  *B60W 30/18* (2012.01)
  *B60L 11/14* (2006.01)

(52) U.S. Cl.
  CPC .. *B60W2510/1055* (2013.01); *B60W 2710/025* (2013.01); *B60W 2710/0672* (2013.01); *B60W 2710/085* (2013.01); *B60Y 2300/429* (2013.01); *Y02T 10/6221* (2013.01); *Y02T 10/6252* (2013.01); *Y02T 10/70* (2013.01); *Y02T 10/7077* (2013.01); *Y10S 903/93* (2013.01)

(56) References Cited

U.S. PATENT DOCUMENTS

| | | | |
|---|---|---|---|
| 2012/0158224 A1* | 6/2012 | Naqvi | F16D 48/06 701/22 |
| 2012/0203417 A1* | 8/2012 | Matsui | B60K 6/48 701/22 |
| 2013/0297128 A1* | 11/2013 | Takamura | B60K 6/48 701/22 |
| 2014/0336904 A1* | 11/2014 | Nakanishi | F02D 17/04 701/110 |

FOREIGN PATENT DOCUMENTS

| | | |
|---|---|---|
| JP | 2010-111144 A | 5/2010 |
| JP | 2010-143287 A | 7/2010 |
| JP | 2010-143308 A | 7/2010 |
| JP | 2011-20541 A | 2/2011 |

\* cited by examiner

CONTROL DEVICE FOR HYBRID VEHICLE

CROSS-REFERENCE TO RELATED APPLICATIONS

This application is a U.S. National stage application of International Application No. PCT/JP2012/071276, filed Aug. 23, 2012, which claims priority to Japanese Patent Application No. 2011-237009 filed in Japan on Oct. 28, 2011, the contents of which are hereby incorporated herein by reference.

BACKGROUND

1. Field of the Invention

The present invention relates to a hybrid vehicle control device that executes an engine start control with a one-motor, two-clutch power train system.

2. Background Information

In the prior art, there is a hybrid vehicle having a one-motor, two-clutch power train system in which when a mode transition request to change to a hybrid vehicle mode occurs while starting into motion, a second clutch CL2 is made to slip and engagement of a first clutch CL1 is started when slippage of the second clutch CL2 has been determined such that the engine is started using the motor as a starter motor (for example, see Japanese Laid Open Patent Application No. 2007-126091). In the following explanation, an electric vehicle mode is called "EV mode" and the hybrid vehicle mode is called "HEV mode."

SUMMARY

For the conventional hybrid vehicle control device, when the engine start control based on a mode transition request is started, the second clutch is changed to a slip engagement by holding the torque transmission capacity of the second clutch at a constant capacity below the motor torque. Consequently, the second clutch can be changed to a slip engagement, but "vehicle longitudinal G stagnation" and "vehicle longitudinal G drop" occur due to the drive force transferred to the drive wheels through the second clutch dropping off and causing the vehicle behavior response to accelerator operation to decline. This is undesirable.

The purpose of the present invention is to solve the problem by providing a hybrid vehicle control device that can improve the vehicle behavior response to accelerator operation when the second clutch is in slip engagement after the engine start control has begun.

In order to realize the purpose described above, the hybrid vehicle control device of the present invention has an engine, a motor, a first clutch, a second clutch, and an engine start control section. The first clutch is disposed between the engine and the motor. The second clutch is disposed between the motor and a drive wheel. The engine start control section is configured to begin an engine start control when a mode transition request to change to a hybrid vehicle mode occurs while an electric vehicle mode in which the first clutch is opened is selected. The engine start control section executes a control to transition the second clutch to a slip engagement, begins engagement of the first clutch when slippage of the second clutch is determined, and starts the engine using the motor as a starter motor. The engine start control section has a CL2 slip transition control section configured to control the transition of the second clutch to the slip engagement when the engine start control is begun based on a mode transition request resulting from an accelerator depression operation, by increasing the torque transmission capacity of the second clutch according to a prescribed slope after dropping the torque transmission capacity of the second clutch to a value smaller than a target drive force.

Consequently, when the engine start control is begun based on a mode transition request resulting from an accelerator depression operation, the CL2 slip transition control section drops the torque transmission capacity of the second clutch to a value smaller than the target drive force and, afterwards, executes a control to transition the second clutch to slip engagement by increasing the torque transmission capacity of the second clutch according to the prescribed slope. That is, when the engine start control is begun, the torque transmission capacity of the second clutch is dropped to a value smaller than the target drive force to such that the input torque of the second clutch causing slip-in exceeds the torque transmission capacity of the second clutch and promotes slip engagement of the second clutch. Then, with the slip engagement of the second clutch promoted, the drive force transmitted to the drive wheel through the second clutch is increased by increasing the torque transmission capacity of the second clutch according to the prescribed slope. Thus, "vehicle longitudinal G stagnation" and "vehicle longitudinal G drop off" are suppressed during a period of preparation for the engine start control spanning from when the control begins until slippage of the second clutch is determined to have occurred. As a result, an improved vehicle behavior response with respect to an accelerator operation can be obtained when the second clutch is put into slip engagement after the engine start control has begun.

BRIEF DESCRIPTIONS OF THE DRAWINGS

Referring now to the attached drawings which form a part of this original disclosure.

Figure 12:
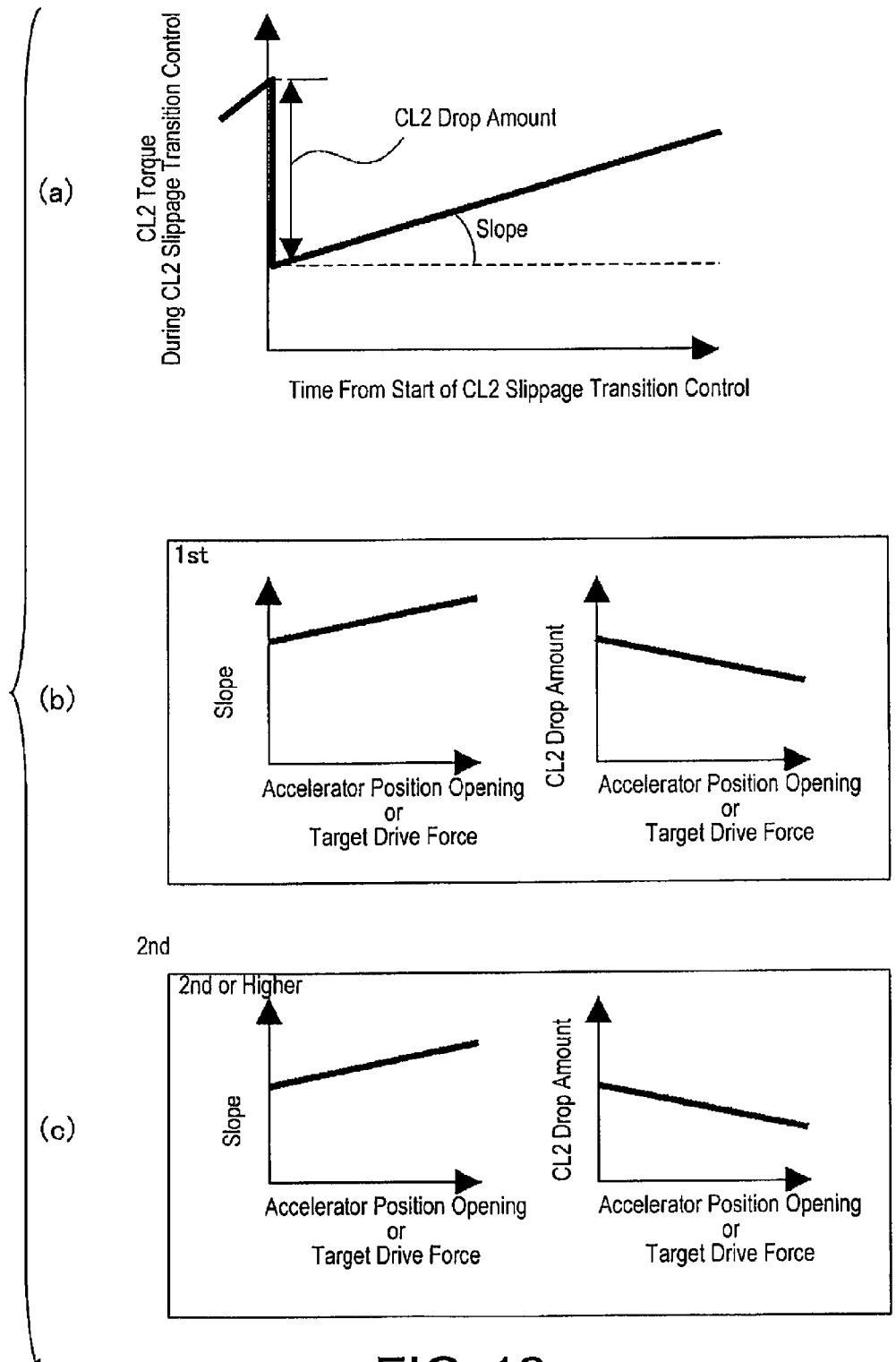

FIG. 12 is a diagram showing various characteristics expressing the torque transmission capacity control content of the second clutch executed by a CL2 slip transition control during the engine start control process. Diagram (a) shows a CL2 torque decrease amount characteristic during the CL2 slip transition control. Diagram (b) shows a CL2 torque slope characteristic and a CL2 drop amount characteristic during first speed. Diagram (c) shows the CL2 torque slope characteristic and the CL2 drop amount characteristic during second speed and higher.

Figure 13:
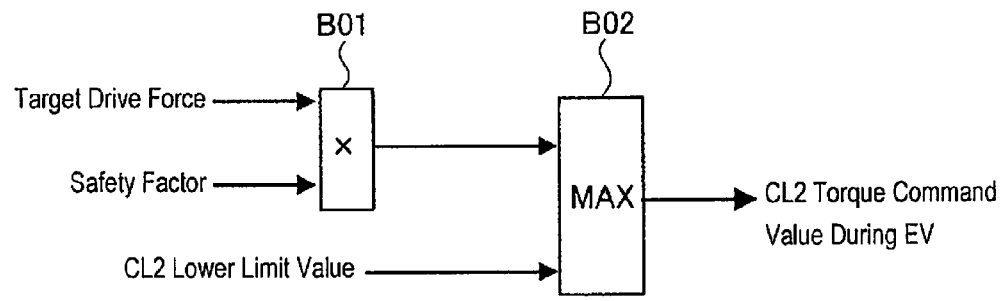

FIG. 13 is a block diagram showing how a CL2 torque command value is determined during EV mode when starting into motion from 0 km/h.

Figure 14:
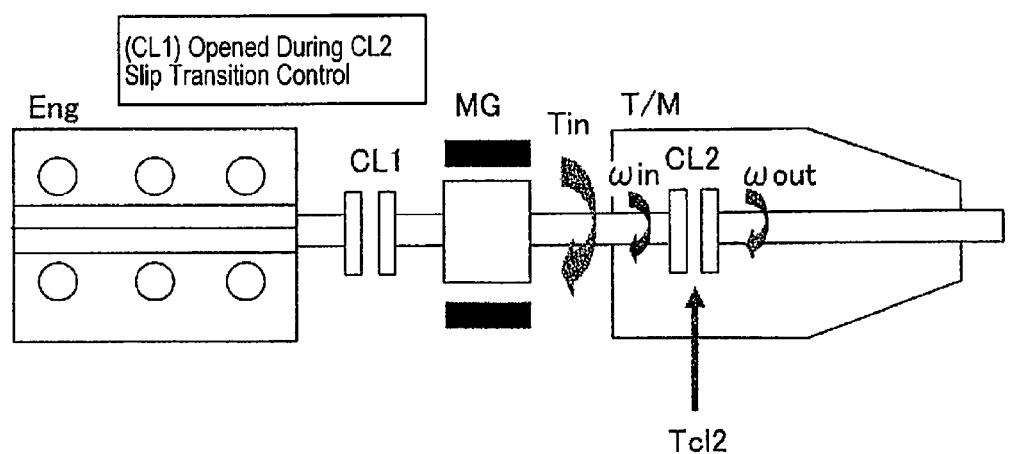

FIG. 14 is a motion explanation diagram showing motion states of the drive train while CL2 is slipping based on an EV→HEV mode transition request.

Figure 15:
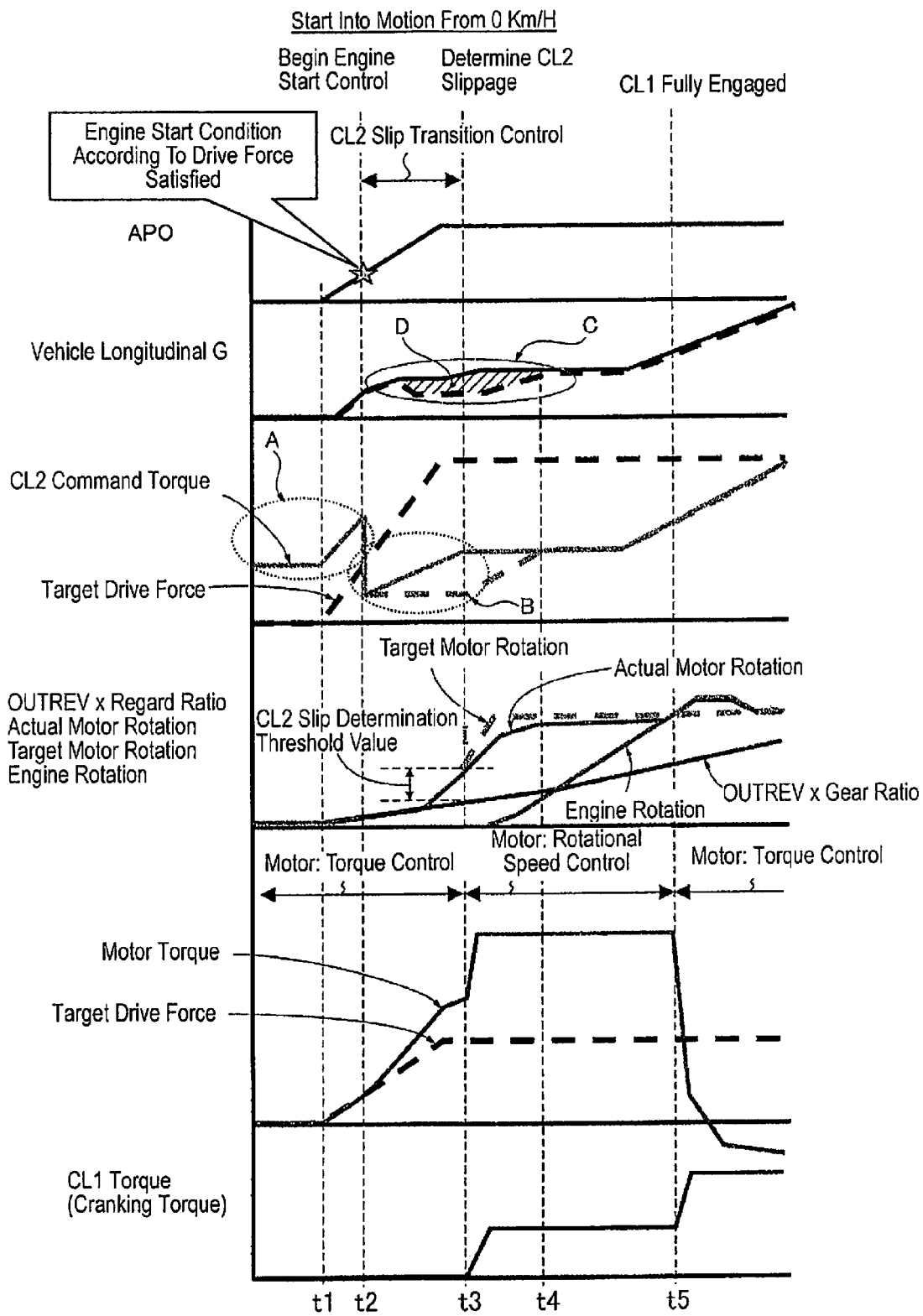

FIG. 15 is a time chart showing the following characteristics during a start into motion from 0 km/h with a control device according to the embodiment: accelerator opening position APO, vehicle longitudinal G, CL2 command torque (target drive force), OUTREV×gear ratio, actual motor rotation, target motor rotation, engine rotation, motor torque (target drive force), and CL1 torque (cranking torque).

Figure 16:
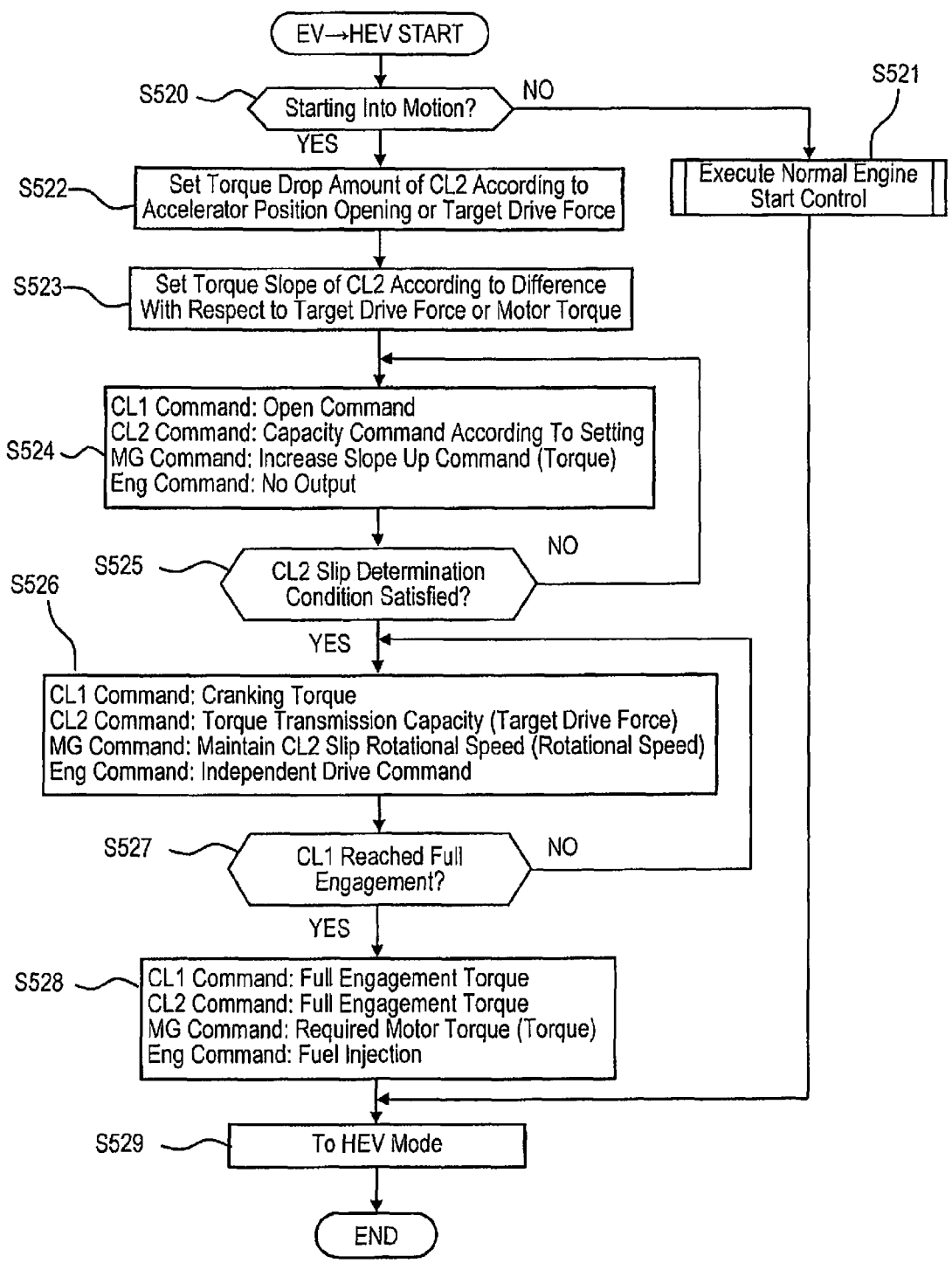

FIG. 16 is a flowchart showing a flow of an engine start control process executed by an integrated controller according to an Embodiment 2 when a request for a transition from EV to HEV mode occurs.

DETAILED DESCRIPTION OF THE EMBODIMENTS

The optimum embodiment for realizing the hybrid vehicle control device in the present invention will now be explained with reference to Embodiments 1 and 2 of the present invention illustrated in the drawings.

Embodiment 1

First, the configuration will be explained. The configuration of the hybrid vehicle control device according to Embodiment 1 will be explained separately regarding the power train system configuration, the control system configuration, the integrated controller configuration, the integrated control process configuration, and the engine start control process configuration.

Power Train System Configuration

Figure 1:
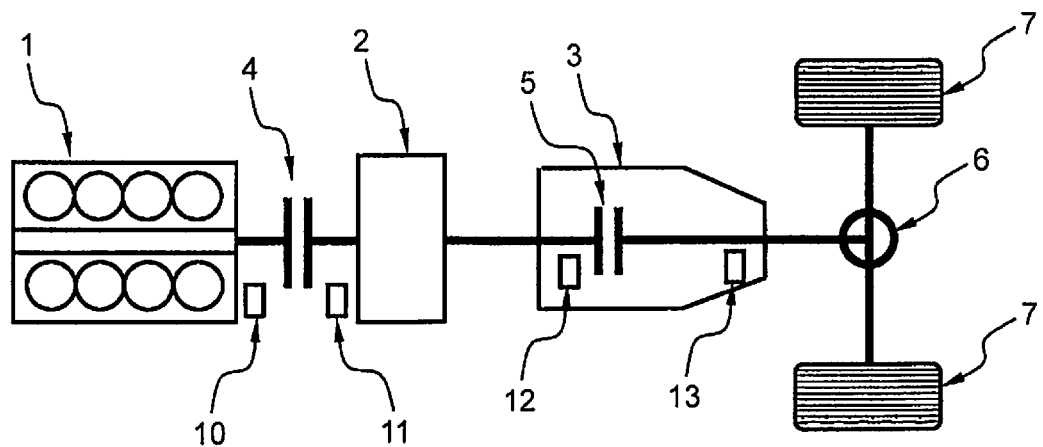
FIG. 1 is a schematic plan view showing a power train system of a hybrid vehicle in which a hybrid vehicle control device in accordance with an Embodiment 1 of the present invention can be applied.

FIG. 1 is shows the power train system of a hybrid vehicle in which a control system according to Embodiment 1 has been applied. The configuration of the power train system will now be explained with reference to FIG. 1.

As shown in FIG. 1, the power train system of the hybrid vehicle according to Embodiment 1 comprises an engine 1, a motor/generator 2, an automatic transmission 3, a first clutch 4, a second clutch 5 (the start clutch), a differential gear unit 6, and tires 7 and 7 (drive wheels).

The hybrid vehicle of Embodiment 1 has a power train system configuration comprising an engine, one motor and two clutches. The running modes include an "HEV mode" achieved by engagement of the first clutch 4, an "EV mode" achieved by disengagement of the first clutch 4, and a "WSC mode" in which the vehicle travels with the second clutch 5 in a slip engagement state.

An output shaft of the engine 1 described above and an input shaft of the motor/generator 2 (abbreviated as "MG") are connected to each other via the variable-torque-capacity first clutch 4 (abbreviated as "CL1").

The output shaft of the motor/generator 2 is connected to an input shaft of the automatic transmission 3 (abbreviated as "AT").

The automatic transmission 3 is a transmission having a plurality of gears and an output shaft connected via the differential gear unit 6 to the tires 7 and 7. The automatic transmission 3 is configured to execute automatic shifting in which the gear is selected automatically according to vehicle speed VSP and the accelerator opening position APO and manual shifting in which a driver selects the gear.

One of the engagement elements, i.e., variable-torque-capacity clutches and brakes, that carries out power transmission inside the transmission unit in different states corresponding to the shift states of the automatic transmission 3 is used as the second clutch 4 (abbreviated as "CL2"). As a result, the automatic transmission 3 synthesizes the power of the engine 1 inputted via the first clutch 4 and the power inputted from the motor/generator 2 and outputs the synthesized power to the tires 7 and 7.

For example, the first clutch 4 and the second clutch 5 can be made of a dry-type multiple plate clutch or a wet-type multiple plate clutch that allow for continuous control of the hydraulic fluid flow rate and the hydraulic pressure by means of a proportional solenoid. The power train system has two operation modes corresponding to the connection state of the first clutch 4. In the disengaged state of the first clutch 4, the power train system is in the "EV mode" in which the vehicle runs with only the power of the motor/generator 2; in the engaged state of the first clutch 4, the power train system is in the "HEV mode" in which the vehicle runs with both the power of the engine 1 and the power of the motor/generator 2.

Provided in the power train system are the following parts: a CL1 input rotation sensor 10 that detects the input rotational speed of the first clutch 4, a CL1 output rotation sensor 11 that detects the output rotational speed of the first clutch 4 (=CL2 input rotational speed=motor rotational speed), a CL2 output rotation sensor 12 that detects the output rotational speed of the second clutch 5, and an AT output rotational speed sensor 13 that detects the output shaft rotational speed of the automatic transmission 3.

Control System Configuration

Figure 2:
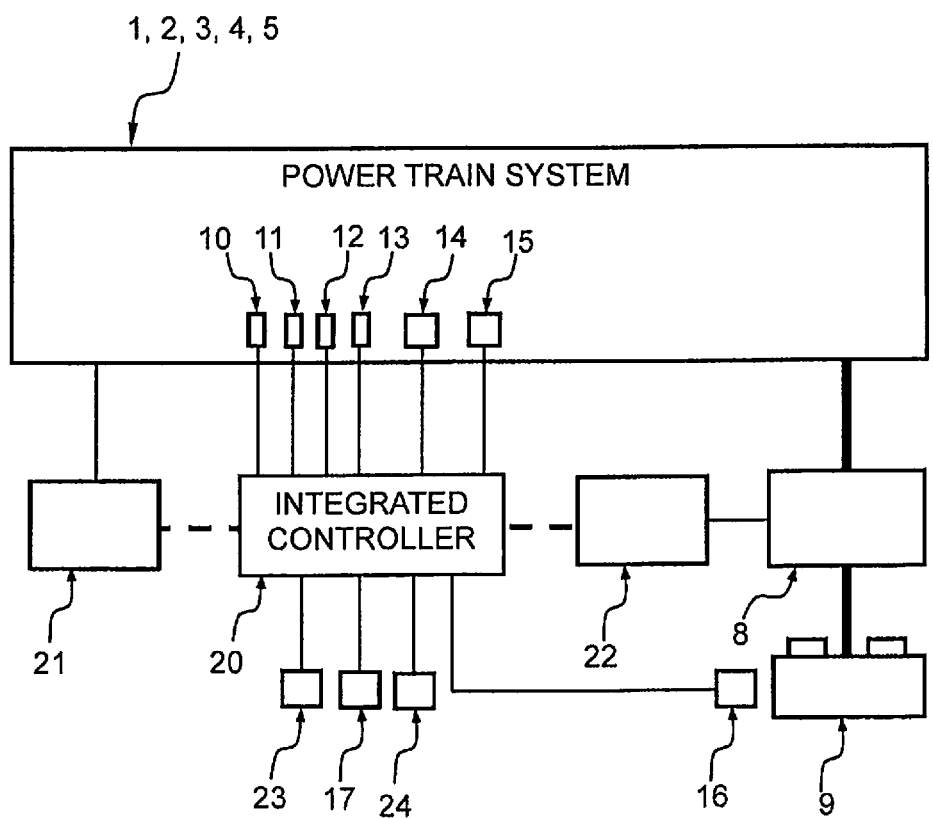
FIG. 2 is a block diagram illustrating the hybrid vehicle control device in which the controller according to Embodiment 1 of the present invention can be applied.

FIG. 2 is a diagram illustrating the control system of the hybrid vehicle wherein the control device according to Embodiment 1 is utilized. The configuration of the control system will be now explained with reference to FIG. 2.

As shown in FIG. 2, the control system according to Embodiment 1 comprises an integrated controller 20, an engine controller 21, a motor controller 22, an inverter 8, a battery 9, a solenoid valve 14, a solenoid valve 15, an accelerator position opening sensor 17, a CL1 stroke sensor 23, a SOC sensor 16, and a transmission mode selection switch 24.

The integrated controller 20 executes integrated control of operating points of the constituent elements of the power train system. The integrated controller 20 selects an operation mode that can realize the drive torque desired by the driver based on the accelerator position opening APO, the battery state of charge SOC, and the vehicle speed VSP (proportional to the rotational speed of the output shaft of the automatic transmission). Then, the target MG torque or the target MG rotational speed is transmitted to the motor controller 22; the target engine torque is transmitted to the engine controller 21, and the driving signal is transmitted to the solenoid valves 14 and 15.

The engine controller 21 controls the engine 1. The motor controller 22 controls the motor/generator 2. The inverter 8 drives the motor/generator 2. The battery 9 stores the electric energy. The solenoid valve 14 controls the hydraulic pressure of the first clutch 4. The solenoid valve 15 controls the hydraulic pressure of the second clutch 5. The accelerator pedal position sensor 17 detects the accelerator position opening (APO). The CL1 stroke sensor 23 detects the stroke of a clutch piston of the first clutch 4 (CL1). The SOC sensor 16 detects the state of charge of the battery 9. The transmission mode selection switch 24 switches between an automatic transmission mode in which transmission gears are shifted in response to the vehicle speed VSP and the accelerator position opening APO, and a manual transmission mode in which the driver selects the transmission gear manually.

Integrated Controller Configuration

Figure 3:
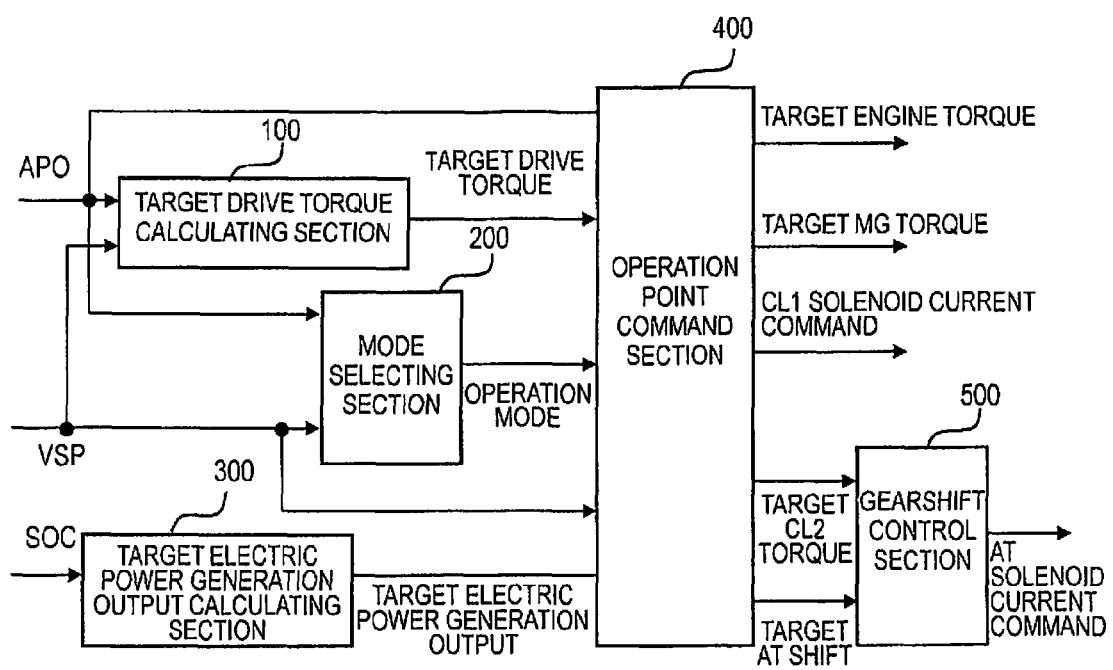
FIG. 3 is a block diagram illustrating the operation of the integrated controller in Embodiment 1 of the present invention.

FIG. 3 is a block diagram illustrating the control process of the integrated controller 20 according to Embodiment 1. The configuration of the integrated controller 20 will now be explained with reference to FIGS. 3-8.

As shown in FIG. 3, the integrated controller 20 comprises a target drive torque calculating section 100, a mode selecting section 200, a target electric power generation output calculating section 300, an operating point command section 400, and a gear shift control section 500.

Figure 4:
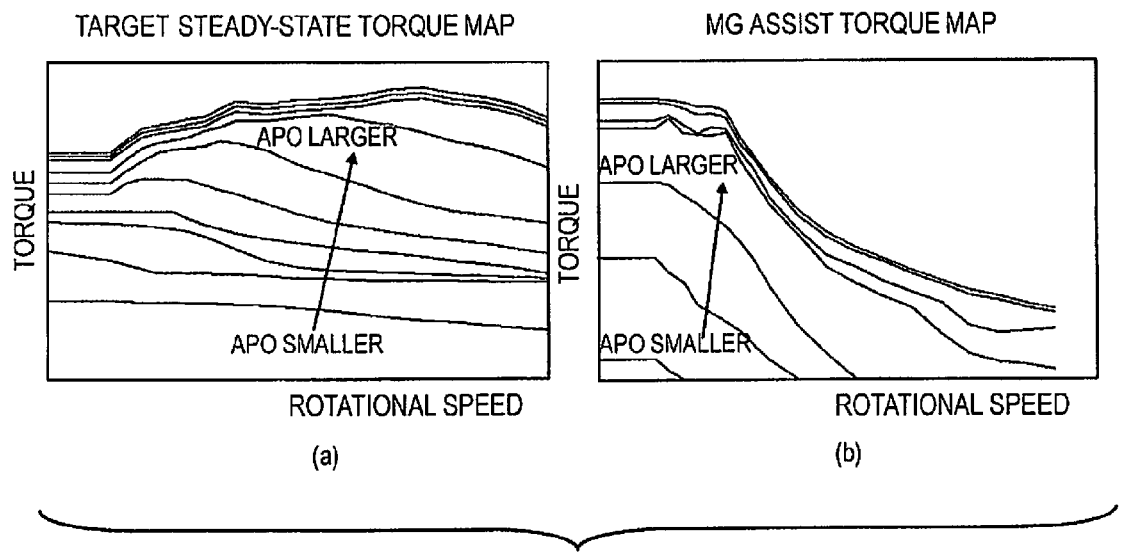
FIG. 4 is a map diagram including a target steady-state torque map (a) and an MG assisted torque map (b) utilized in the control system of Embodiment 1 of the present invention.

The target drive torque calculating section 100 uses the target steady-state drive force map shown in FIG. 4(*a*) and the MG assisted drive force map shown in FIG. 4(*b*) to calculate a target steady-state drive force and an MG assist drive force from the accelerator position opening APO and the vehicle speed VSP.

Figure 5:
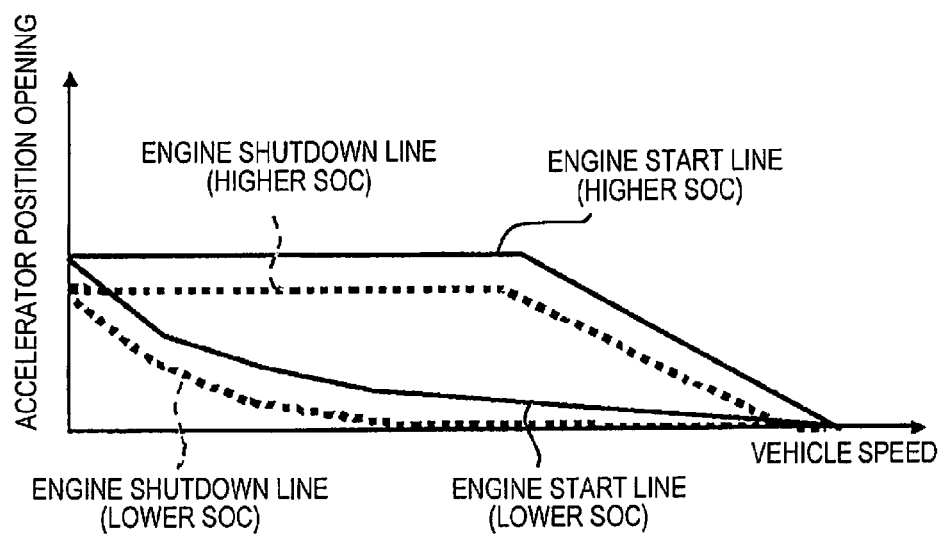
FIG. 5 is a map diagram illustrating the engine startup/shutdown line map utilized in the controller in Embodiment 1 of the present invention.

The mode selecting section 200 uses an engine startup/shutdown line map set according to the accelerator position versus the vehicle speed as shown in FIG. 5 to calculate the operation mode (HEV mode or EV mode). The engine startup lines and the engine shutdown lines are set as characteristics that decrease in a direction of smaller accelerator position openings APO as the state of charge SOC decreases, as indicated by the representative characteristics of the engine startup lines (high SOC, low SOC) and the engine shutdown lines (high SOC, low SOC) shown in the figure.

Figure 6:
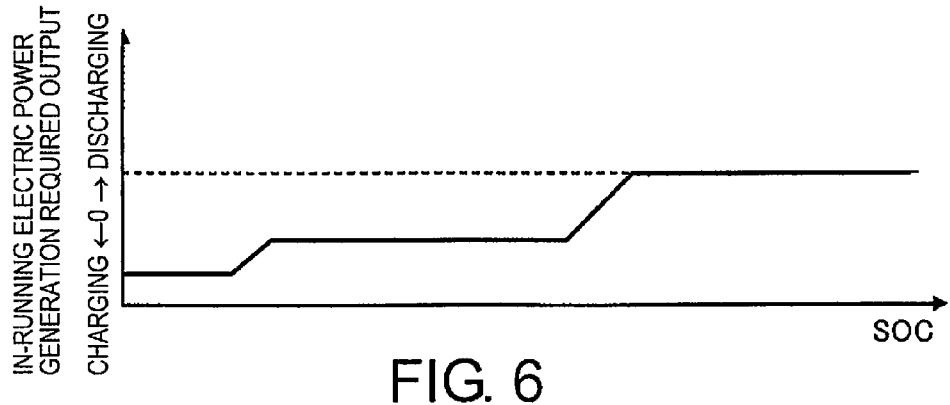
FIG. 6 is a diagram illustrating the characteristics of the electric power generation output required while the vehicle is running with respect to the state of charge SOC utilized in the controller of Embodiment 1 of the present invention.
Figure 7:
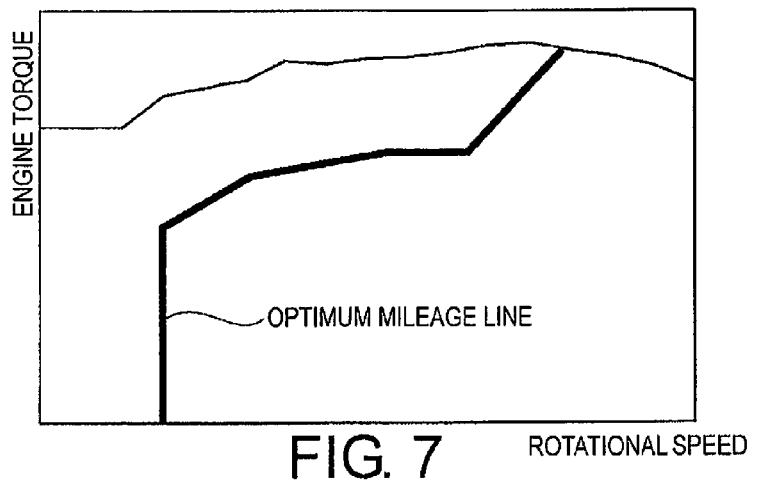
FIG. 7 is a diagram illustrating the characteristics of the optimum mileage line of the engine utilized in the controller of Embodiment 1 of the present invention.

The target electric power generation output calculating section 300 uses the in-running electric power generation required output map shown in FIG. 6 to calculate the target electric power generation output from the state of charge SOC. Also, the output needed for increasing the engine torque from the current operating point to the optimum mileage line shown in FIG. 7 is calculated and compared to the target electric power generation output described above, and the lower output is added as the required output to the engine output.

The operating point command section 400 receives the accelerator position opening APO, the target steady-state torque, the MG assist torque, the target mode, the vehicle speed VSP, and the required electric power generation output as input. Then, with this input information taken as an operating point arrival target, the transient target engine torque, the target MG torque, the target CL2 torque capacity, the target gear ratio, and the CL1 solenoid current command are calculated.

Figure 8:
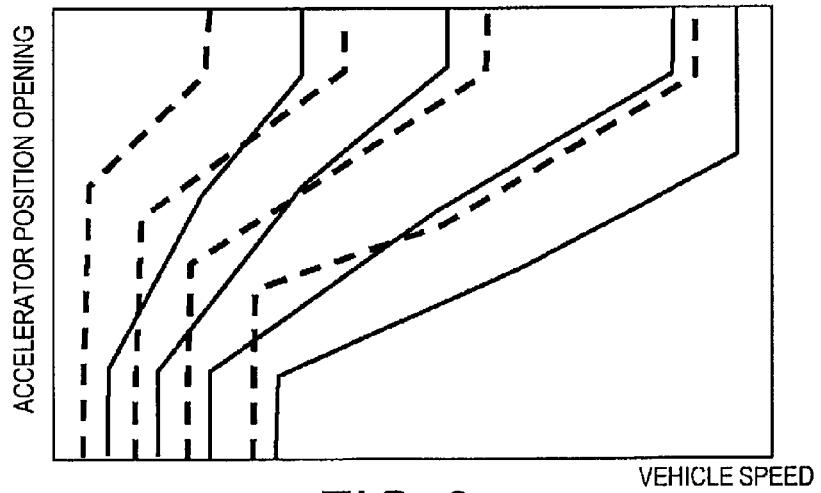
FIG. 8 is a space charge map diagram illustrating an example of the space charge line in the automatic transmission of Embodiment 1 of the present invention.

Based on the target CL2 torque capacity and the target gear ratio, the gear shift control section 500 drives and controls the solenoid valves in the automatic transmission 3 so that the capacity and gear ratio are reached. FIG. 8 is a diagram illustrating an example of the gear shift line map utilized in the gear shift control. Based on the vehicle speed VSP and the accelerator position opening APO, a determination is made regarding the next gear shift step from the current gear shift step; if there is a request for the gear shift, the gear shift clutch is controlled to make the gear shift.

Integrated Control Process Configuration

Figure 9:
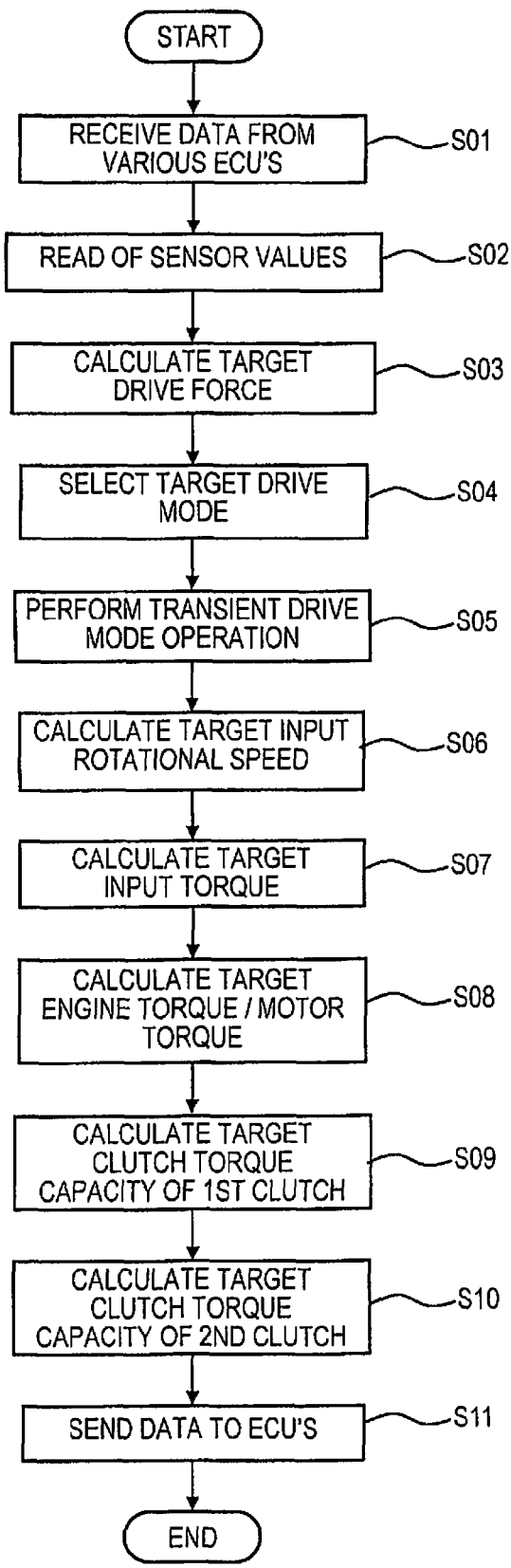
FIG. 9 is a flowchart illustrating the configuration and flow of the integrated control process executed in the integrated controller of Embodiment 1 of the present invention.

FIG. 9 shows the flow of the integrated control process carried out by the integrated controller 20 in Embodiment 1. The integrated control process configuration will now be explained with reference to FIG. 9 and FIG. 10.

In step S01, the data are received from the various control apparatuses. Then, in the next step S02, the sensor value is read, and the information needed for the later control process is obtained.

In step S03, in continuation of reading sensor values in step S02, the target drive force is calculated based on the vehicle speed VSP, the accelerator position opening APO, and a braking force. Control then proceeds to step S04.

Figure 10:
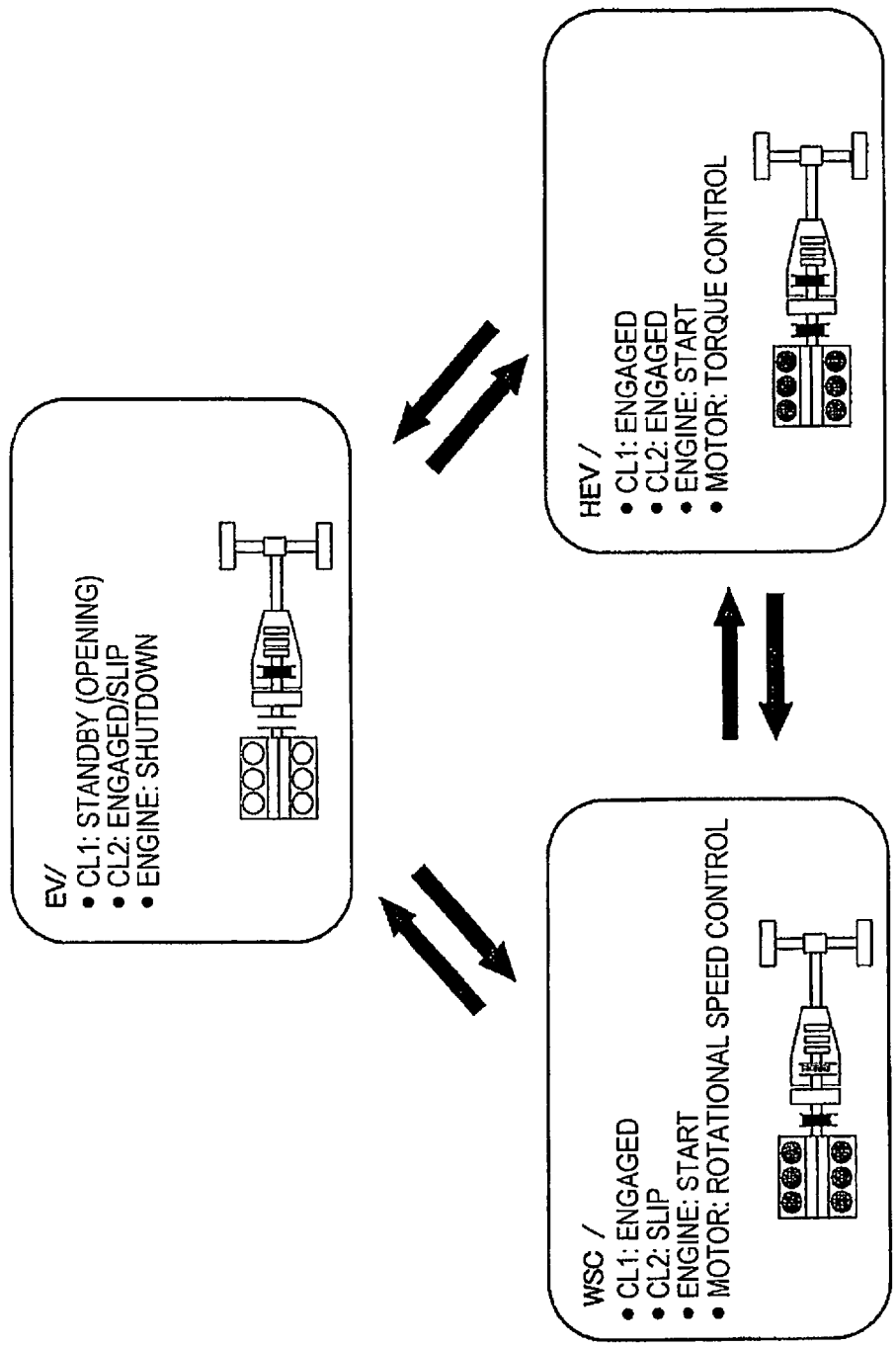
FIG. 10 is a diagram illustrating an example of the target running mode transition in the target running mode control process executed in step S04 shown in FIG. 9.

In step S04, in continuation of calculating the target drive torque carried out in step S03, the target running mode is selected according to the target drive torque, the state of charge SOC, the accelerator position opening APO, the vehicle speed VSP, the road gradient, and other vehicle states. Control then proceeds to step S05. As a reference, FIG. 10 shows an excerpt of the target running mode in which mutual transition takes place between the "EV mode," the "HEY mode," and the "WSC mode." In step S04, an engine start is executed when a mode transition from the "EV mode" to the "HEV mode" or the "WSC mode" is selected.

In step S05, in continuation of the target running mode control process in step S04, a transient running mode is computed if a mode transition request to switch among the running modes has occurred, the computation involving, for example, selecting a motor control mode and an engine start timing according to the states of the first clutch 4 (CL1) and the second clutch 5 (CL2) at the time of engine starting. Control then proceeds to step S06. The transient running mode computation includes an engine start control process based on a mode transition request to transition from the "EV mode" to the "HEV mode" (see FIG. 11).

In step S06, in continuation of the transient running mode computation executed in step S05, a target input rotational speed is calculated according to the running mode state and the motor control state determined in step S05. Control then proceeds to step S07.

In step S07, in continuation of the target input rotational speed calculating in step S06, a target input torque is calculated in consideration of the target drive torque and the protection of the various types of devices. Control then proceeds to step S08.

In step S08, in continuation of the target input torque calculating in step S07, a torque distribution with respect to the engine 1 and the motor/generator 2 is determined and respective target values for each are calculated in consideration of an electric power generation request and the target input torque calculated in step S07. Control then proceeds to step S09.

In step S09, in continuation of the target engine torque/motor torque calculating in step S08, a target clutch torque capacity of the first clutch 4 (CL1) is calculated according to a command determined in the transient running mode computation of step S05. Control then proceeds to step S10.

In step S10, in continuation of the target first-clutch torque capacity calculating in step S09, a target clutch torque capacity of the second clutch 4 (CL2) is calculated according to the CL2 slip rotational speed and the running mode state determined in step S05. Control then proceeds to step S11.

In step S11, in continuation of the target second-clutch torque capacity calculating in step S10, the data are sent to each controller and then the process ends.

Engine Start Control Process Configuration

Figure 11:
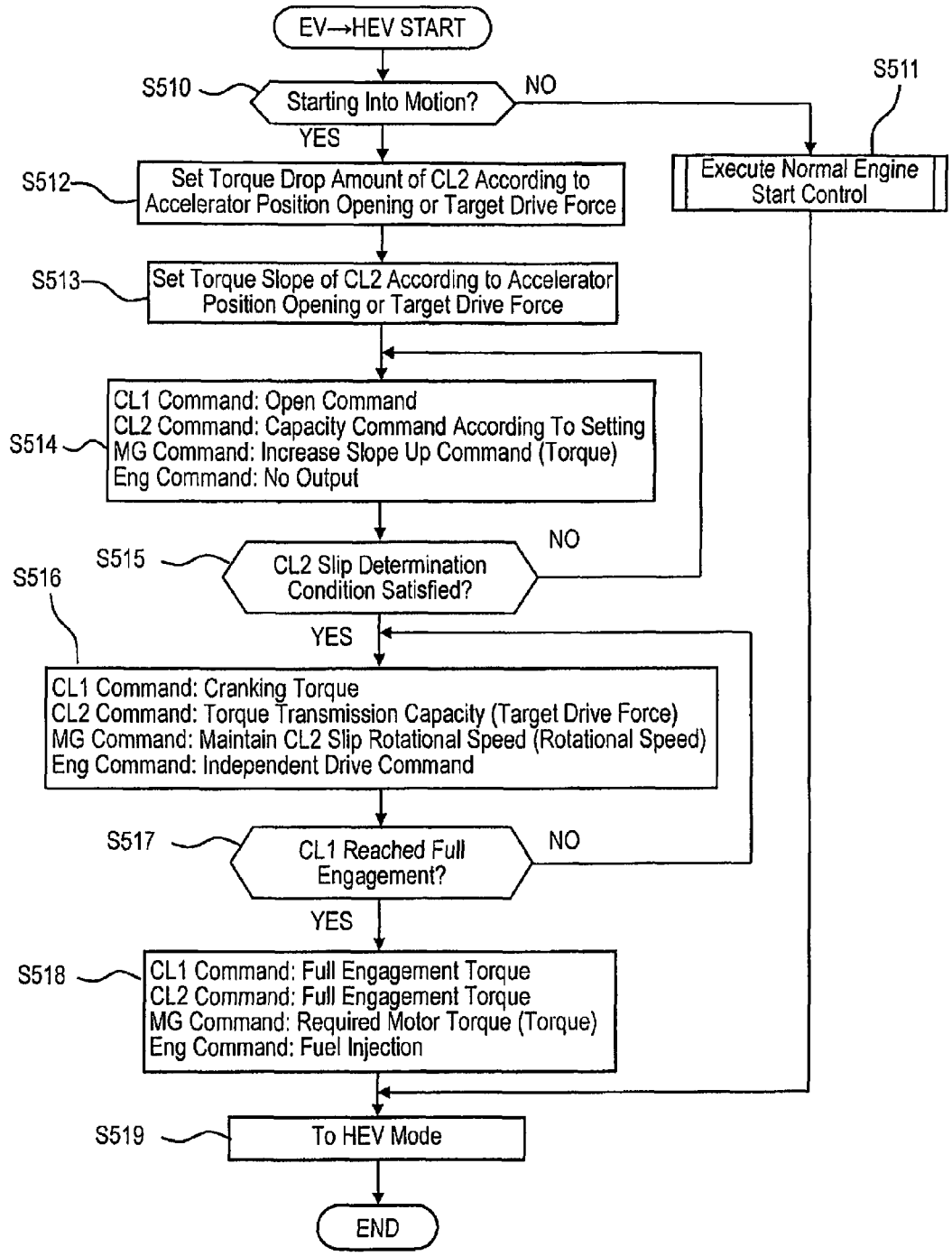
FIG. 11 is a flowchart illustrating the flow of an engine start control process executed by the integrated controller according to Embodiment 1 when a request for a transition from EV to HEV mode occurs.

FIG. 11 shows the flow of the engine start control process executed by the integrated controller 20 according to Embodiment 1 during an EV→HEV mode transition request (engine start control means). The engine start control process configuration will now be explained based on FIG. 11. The engine start control process starts when a mode transition request for changing to the "HEV mode" occurs while the "EV mode" is selected.

In step S510, it is determined if the EV→HEV mode transition request is an EV→HEV mode transition request that occurred when starting into motion due to an accelerator depression operation. If YES (engine start request for motion start), then the process proceeds to step S512. If NO (engine start request other than for motion start), then the process proceeds to step S511.

In step S511, in continuation of the determination of the engine start request other than for a motion start made in step S510, a normal engine start control is executed with a CL2 slip transition control that transitions the second clutch 5 into a slip engagement by holding the torque transmission capacity of the second clutch 5 fixed at a value below the motor torque. The process then proceeds to step S519.

In step S512, in continuation of the determination of the engine start request for a motion start made in step S510, a drop amount is set by which the torque transmission capacity of the second clutch 5 will be dropped to a value smaller than the target drive force at the point in time when the engine start control begins. The process then proceeds to step S513. As shown in FIGS. 12 (b) and (c), the drop amount of the torque transmission capacity of the second clutch 5 is set to be smaller as the accelerator position opening or the target drive force is larger. Additionally, the drop amount is set to be larger when the automatic transmission 3 is in first speed than when the automatic transmission 3 is in second speed or higher.

In step S513, in continuation of the setting of the drop amount of the torque transmission capacity of the second clutch 5 in step S512, a prescribed torque capacity increase slope at which the torque transmission capacity of the second clutch 5 will be increased after being dropped when the engine start control begins is set. The process then proceeds to step S514. The slope of the torque capacity increase executed after the torque transmission capacity of the second clutch 5 is dropped is set to be larger as the accelerator position opening or the target drive force is larger, as shown in FIGS. 12 (b) and (c). Additionally, the slope is set to be larger when the automatic transmission 3 is in first speed than when the automatic transmission 3 is in second speed or higher.

In step S514, in continuation of the setting of the increase slope of the torque transmission capacity of the second clutch 5 in step S513 or a determination that a CL2 slip determination condition is not satisfied in step S515, a CL1 command, a CL2 command, an MG command, and an Eng command for the CL2 slip transition control are outputted. The CL1 command is an open command for the first clutch 4. The CL2 command is a torque transmission capacity command directed to the second clutch 5 according to the drop amount and the slope set in step S512 and S513. The MG command is a torque command that sets the increase gradient of the motor torque outputted from the motor/generator 2 to be larger than increase gradient of the target drive force (motor torque control).

In step S515, in continuation of the command outputs to the drive train elements in step S514, a determination is made as to whether or not a slip determination condition indicating that the second clutch 5 is in a slip engagement state is satisfied. If YES (slip determination condition satisfied), then control proceeds to step S516. If NO (slip determination condition not satisfied), then control returns to step S514. Here, the slip determination condition is satisfied when a slip amount of the second clutch 5 becomes equal to or large than a slip determination threshold value.

In step S516, in continuation of the slip determination condition check executed in step S515, the CL1 command, CL2 command, MG command, and Eng command are outputted during the cranking control until the first clutch 4 is fully engaged. Control then proceeds to step S517. Here, the CL1 command is a torque transmission capacity for the first clutch 4 that achieves a torque necessary to crank the engine 1. The CL2 command is a torque transmission capacity for the second clutch 5 that achieves the target drive force. The MG command is a rotational speed command holds the input rotational speed of the second clutch 5 higher than the output rotational speed such that the slip engagement of the second clutch 5 is maintained (motor rotational speed control). The Eng command is a fuel injection command and an ignition command that are outputted when the engine has been cranked to a rotational speed at initial explosion is possible.

In step S517, in continuation of the command output to the drive train elements executed in step S516, a determination is made as to whether or not the first clutch 4 has reached full engagement. If YES (CL1 full engagement reached), then control proceeds to step S518. If NO (CL1 full engagement not reached), then control returns to step S516.

In step S518, in continuation of the determination that CL1 full engagement has been reached in step S517, the CL1 command, the CL2 command, the MG command, and the Eng command for post engine start are outputted. Control then proceeds to step S519. Here, the CL1 command is a torque transmission capacity command for transitioning the first clutch 4 to the fully engaged state. The CL2 command is a torque transmission capacity command for transitioning the second clutch 5 to the fully engaged state. The MG command is a motor torque command for obtaining a difference equal to the target drive force minus the engine torque (motor torque control). The Eng command is a fuel injection command corresponding to the accelerator position opening.

In step S519, in continuation of the command output to the drive train elements in step S518, the mode is transitioned to the "HEV mode" upon confirming that the first clutch 4 and the second clutch 5 have transitioned to the fully engaged state. The process then ends. Steps S512 to S515 correspond to the CL2 slip transition control section.

Operational actions will now be explained. The operational action of the hybrid vehicle control device according to Embodiment 1 will be explained separately regarding the engine start control process action, the CL2 slip transition control action, and the accelerator response improvement action during starting into motion from 0 km/h.

Engine Start Control Process Action

If an EV→HEV mode transition request occurs when not starting into motion from a stop, then the steps of the flowchart shown in FIG. 11 are executed as follows: step S510→step S511→step S519→End.

That is, if the EV→HEV mode transition request occurs at a time other than when starting into motion from a stop, then the normal engine start process is executed. For example, the normal engine start process executed when the battery SOC declines is configured to control the torque transmission capacity of the second clutch 5 to a fixed torque below the motor torque such that the second torque 5 slips. When slippage of the second clutch 5 is detected, engagement of the first clutch 4 is begun and the engine rotational speed is increased by a cranking torque. When the engine rotational speed reaches a rotational speed at which initial explosion is possible, the engine 1 is made to undergo combustion operation and the first clutch 4 is engaged fully when the motor rotational speed and the engine rotational speed become nearly the same. Then, the second clutch 5 is fully engaged (locked up) to transition into the "HEV mode."

Meanwhile, if the EV→HEV mode transition request occurs when starting into motion from a stop, then the steps of the flowchart shown in FIG. 11 are executed as follows: step S510→step S512→step S513→step S514→step S515. The sequence of step S514→step S515 is repeated while the CL2 slip determination condition is not satisfied in step S515. That is, in step S512, the control sets the drop amount by which the torque transmission capacity of the second clutch 5 will be dropped to equal a value smaller than the target drive force at the point in time when the engine start control begins. Next, in step S513, the prescribed torque capacity increase slope at which the torque transmission capacity of the second clutch 5 will be increased after being dropped when the engine start control begins is set. Next, in step S514, the CL1 command, the CL2 command, the MG command, and the Eng command for the CL2 slip transition control are outputted. Here, the CL2 command is a torque transmission capacity command for controlling the second clutch 5 according to the drop amount and the slope set in steps S512 and S513.

When the CL2 slip determination condition is satisfied in step S515, the control proceeds as follows: step S515→step S516→step S517. At step S517, the sequence of step S516→step S517 is repeated until the CL1 fully engaged condition is not satisfied. That is, in step S516, the CL1 command, CL2 command, MG command, and Eng command for cranking control are outputted until the first crank 4 is fully engaged. Here, the CL1 command is a torque transmission capacity command for controlling the first clutch 4 to obtain a torque necessary to crank the engine 1. The CL2 command is a torque transmission capacity command for controlling the second clutch 5 to obtain the target drive force.

When the CL1 fully engaged condition is satisfied in step S517, the control proceeds from step S517 as follows: step S518→step S519→End. In this way, the mode transition from "EV mode" to "HEV mode" is completed.

Thus, when the engine start control begins based on an EV→HEV mode transition request while starting into motion, the torque transmission capacity of the second clutch 5 is dropped to a value smaller than the target drive force and, afterwards, the CL2 slip transition control is executed to transition the second clutch 5 into slip engagement by increasing the torque transmission capacity of the second clutch 5 at the prescribed slope.

That is, when the engine start control is begun, the torque transmission capacity of the second clutch 5 is dropped to a value smaller than the target drive force such that the input torque (=target drive force) of the second clutch 5 causing slip-in exceeds the torque transmission capacity of the second clutch 5 and promotes slip engagement of the second clutch 5. Then, with the slip engagement of the second clutch 5 promoted, the drive force transmitted to the tires 7 and 7, i.e., the drive wheel, through the second clutch 5 is increased by increasing the torque transmission capacity of the second clutch 5 according to the prescribed slope. The torque transmission capacity of the second clutch 5 defines the drive force transmitted to the tires 7 and 7.

Consequently, a "vehicle longitudinal G stagnation" and a "vehicle longitudinal G drop off" are suppressed during a period of preparation for the engine start control spanning from when the control begins until slippage of the second clutch 5 is determined to have occurred. As a result, an improved vehicle behavior (vehicle longitudinal G) response with respect to an accelerator operation can be obtained when the second clutch 5 is put into slip engagement after the engine start control has begun.

CL2 Slip Transition Control Action

The CL2 slip transition control executed in the engine start control process explained above is particularly distinctive with respect to the normal control. The action of the CL2 slip transition control will now be explained with reference to FIGS. 12-15.

First, the setting of the torque transmission capacity of the second clutch 5 during EV mode before engine starting will be explained (FIG. 13 and arrow A in FIG. 15). The CL2 clutch command value during EV mode is calculated as shown in FIG. 13. In the block B01, a target drive force that takes into consideration a safety factor is calculated by multiplying the target drive force by a safety factor. Then, in the block B02, the larger value of the CL2 lower limit value and the target drive force that takes into consideration the safety factor is selected and the selected larger value is set as the CL2 torque command value. That is, during the EV mode, the CL2 torque command value is set to a value at which the second clutch 5 barely does not slide.

Motion equations related to Embodiment 1 will now be explained (FIG. 14).

<Basic Motion Equation when CL2 Slips>

CL2 Slip Start Condition $$T\text{in (input torque)} > T\text{cl2 (CL2 engagement torque)} + F\text{in (friction on input shaft side)} \quad (1)$$

CL2 Slip Amount (Assumption: CL2 Slip Start Condition is Satisfied)

$$\omega\text{in (input shaft rotational speed)} - \omega\text{out (output shaft rotational speed} \times \text{gear ratio)} = \int\{(T\text{in} - T\text{cl2})/I\text{in (inertia of input shaft side)}\} \quad (2)$$

Vehicle Longitudinal G of Vehicle at Time of CL2 Slip $$\text{Vehicle longitudinal } G = \{(T\text{cl2}*\text{gear ratio}*\text{efficiency}/\text{tire dynamic radius}) - \text{running resistance}\}/\text{vehicle weight} \quad (3)$$

<Control Computation Method>

CL2 Slip Determination

ωin (input shaft rotational speed)−ωout (output shaft rotational speed×gear ratio)≥CL2 slip determination threshold value The equation (3) for the vehicle longitudinal G expresses that the flatter the slope of the CL2 engagement torque Tcl2 is, the flatter the vehicle longitudinal G is and the poorer the response is. The equation also expresses that the more the CL2 engagement torque Tcl2 is removed to cause CL2 to slip, the more the vehicle longitudinal G drop off occurs.

Therefore, as a comparative example, consider a configuration in which the CL2 engagement torque Tcl2 is reduced at the beginning of the engine start control and CL2 engagement torque is held continuously below the motor torque from when the CL2 actually slips until the CL2 slippage is determined to have occurred. In the CL2 slip transition control of this comparative example, the CL2 can be made to slip but the vehicle longitudinal G is flat, the response is poor, and a vehicle longitudinal G drop off occurs.

Conversely, if the CL2 engagement torque Tcl2 is reduced with respect to the input torque Tin that causes slip-in at the beginning of the engine start control and the CL2 engagement torque is increased from the time when CL2 actually slips until the CL2 slip determination occurs, then the vehicle longitudinal G will rise, the response will improve, and a drop off of vehicle longitudinal G will not occur. Regarding the slippage of CL2, CL2 can be made to slip if the CL2 engagement torque is increased with respect to the input torque Tin causing slip-in (increase according to target drive force) to a level satisfying the aforementioned equation (1) for the CL2 slip start condition.

Based on the preceding explanation, as a measure regarding the vehicle longitudinal G, the setting of the CL2 torque drop amount for reducing the CL2 engagement torque Tcl2 from the CL2 torque command value of the EV mode and the setting of the slope for increasing the CL2 torque until the CL2 slip determination occurs become important (arrow B in FIG. 15). Also, as a measure regarding the CL2 slippage, the setting of the motor torque (input torque Tin) is important. The setting of the CL2 torque drop amount, the CL2 torque increase slope, and the motor torque during the CL2 slip transition control will now be explained.

CL2 Torque Drop Amount

In Embodiment 1, as shown in FIGS. 12 (b) and (c), the drop amount of the torque transmission capacity of the second clutch 5 is set to be smaller as the accelerator position opening or the target drive force is larger. That is, the CL2 slips readily because the larger the accelerator position opening or the target drive force is, the larger the input torque of the second clutch 5 becomes. Also, the value to which a driver can expect the vehicle longitudinal G to rise increases. Consequently, since the drop amount is smaller as the accelerator position opening or the target drive force is larger, it is possible to suppress a decline of the vehicle longitudinal G at the beginning of the engine start control and to satisfy the demand for improved accelerator response.

Also, the drop amount is set to be larger when the automatic transmission 3 is in first speed than when the automatic transmission 3 is in second speed or higher. Since the torque transmission capacity of the second clutch 5 is larger before the drop when second speed or higher is selected than when first speed is selected, the degree of ease with which the second clutch 5 is made to slip can be ensured regardless of which transmission gear is selected.

Additionally, when a frictional engaging element used for gear selection in the automatic transmission 3 is used as the second clutch 5 as in Embodiment 1, the type of clutch may vary depending on the selected transmission gear. Thus, with respect to different types of clutch, the operability can be improved by setting the drop amount of the CL2 torque to account for any tradeoff regarding the slip time or the response of the clutch in accordance with the response characteristics of the respective clutches.

CL2 Torque Increase Slope

In Embodiment 1, the slope at which the torque transmission capacity of the second clutch 5 is increased after the torque capacity is dropped is set to be larger as the accelerator position opening or the target drive force is larger, as shown in FIG. 12 (b) or (c). Since the input torque of the second clutch 5 becomes larger as the accelerator pedal opening or the target drive force becomes larger, this arrangement makes the CL2 slip readily. Also, the value to which a driver can expect the vehicle longitudinal G to rise increases. Consequently, by making the slope at which the torque capacity is increased larger when the accelerator position opening or the target drive force is larger, the rise response of the vehicle longitudinal G can be made to occur earlier and the demand to improve the accelerator response can be satisfied.

Additionally, the slope is set to be larger when the automatic transmission 3 is in first speed than when the automatic transmission 3 is in the automatic transmission 3 is in second speed or higher. This is done because the value to which a driver can expect the vehicle longitudinal G to rise is higher when the first speed is selected than when the second or higher speed is selected.

Furthermore, when a frictional engaging element used for gear selection in the automatic transmission 3 is used as the second clutch 5 as in Embodiment 1, the type of clutch may vary depending on the selected transmission gear. Thus, with respect to different types of clutch, the operability can be improved by setting the slope at which the torque capacity of the CL2 is increased to account for any tradeoff regarding the slip time or the response of the clutch in accordance with the response characteristics of the respective clutches.

Motor Torque Setting

Based on the equation (1) for the CL2 slip start condition and the equation (2) for the CL2 slip amount, it is clear that the motor torque (input torque Tin) can be increased beyond a value corresponding to the target drive force to cause the CL2 to slip more immediately. In Embodiment 1, the MG command issued from the point in time when the engine start control begins until the CL2 slip determination is made is a torque command that increases the motor torque outputted from the motor/generator 2 at an increase gradient larger than the increase gradient of the target drive force (see the motor torque command characteristic and the target drive force characteristic in FIG. 15). Thus, slippage of the second clutch 5 is promoted more and the slip determination timing of the second clutch 5 is earlier than a case in which the motor torque is controlled according to the target drive force and the increase gradient of the motor torque is set to coincide with the increase gradient of the target drive force.

Accelerator response improvement action during starting into motion from 0 km/h

The accelerator response improvement action achieved using the previously explained CL2 slip transition control during starting into motion from 0 km/h will now be explained with reference to the time chart shown in FIG. 15.

At a time t1, as indicated by the accelerator position opening characteristic, a driver begins an accelerator depression operation while the vehicle is stopped in EV mode. At a time t2, the engine start control begins in response to the driver's accelerator operation. At a time t3, the CL2 slip determination occurs, and the CL2 slip transition control period is expressed between the time t2 and the time t3. At a time t4, the CL2 engagement torque of the comparative example control reaches a tore corresponding to the target drive force. At a time t5, CL1 is fully engaged and the engine rotational speed and the motor rotational speed are the same.

Until the time t1, the vehicle is stopped in the EV mode and the second clutch 5 is engaged with a torque below the CL2 lower limit value. At the time t1, the driver begins the accelerator depression operation, the motor torque rise according to the target drive force, and a vehicle speed (OUTREV×gear ratio) develops. From the accelerator depression operation beginning time t1 to the engine start control beginning time t2, the torque transmission capacity of the second clutch 5 increases from the CL2 lower limit value according to the CL2 command torque in response to the increase of the target drive force such that second clutch 5 barely does not slide.

When the engine start control beginning time t2 is reached, the torque transmission capacity of the second clutch 5 is dropped by an amount set based on the accelerator pedal opening or the target drive force and begins increasing according to a slope set based on the accelerator pedal opening or the target drive force. Also, when the engine start control beginning time t2 is reached, the increase gradient of the motor torque is increase according to the torque command to be larger than the increase gradient of the target drive force.

Thus, the vehicle longitudinal G does not drop off or become stagnant during the period between the engine start control beginning time t2 and the CL2 slip determination time t3 (solid line characteristic indicated with arrow C). Also, between the time t2 and the time t3, as shown by the dotted line characteristic indicated with the arrow B, the vehicle longitudinal G will drop off and stagnate as shown by the dotted line characteristic indicated with the arrow C if the CL2 slip transition control is executed such that the torque transmission capacity of the second clutch 5 is held down after being dropped.

When the CL2 slip determination time t3 is reached, the torque transmission capacity of the second clutch 5 is held at a value corresponding to the target drive force such that a vehicle longitudinal G characteristic according to the target drive force is secured. Meanwhile, if the CL2 slip transition control is executed according to the comparative example during the period between the time t2 and the time t3, then the torque transmission capacity of the second clutch 5 will reach a value corresponding to the target drive force at a time t4 and the vehicle longitudinal G will drop off and stagnate until the time t4 is reached. The period from the CL2 slip determination time t3 until a time when CL1 becomes fully engaged is a period during which engine starting is conducted by setting the engagement torque of the first clutch 4 to a cranking torque and cranking the engine. When the CL1 fully engaged time t5 is reached, the first clutch 4 and the second clutch 5 are engaged at large torques such that the fully engaged state is maintained regardless of the size of the transmitted torque and the vehicle transitions into the "HEV mode."

Thus, the D region of FIG. 15 indicates the amount of improvement to the vehicle longitudinal G during starting into motion from 0 km/h that is obtained using the CL2 slip transition control according to Embodiment 1, i.e., the amount improvement to the accelerator response, which is the response of the vehicle longitudinal G with respect to an accelerator depression operation.

Effects will now be explained. Effects that can be obtained with a hybrid vehicle control device according to Embodiment 1 are listed below.

(1) The hybrid vehicle control device comprises: an engine 1, a motor (motor/generator 2), a first clutch 4, a second clutch 5 and an engine start control section (FIG. 11). The first clutch 4 is disposed between the engine 1 and the motor (motor/generator 2). The second clutch 5 is disposed between the motor (motor/generator 2) and a drive wheel (tires 7 and 7). The engine start control section (FIG. 11) is configured to begin an engine start control when a mode transition request to change to a hybrid vehicle mode (HEV mode) occurs while an electric vehicle mode (EV mode) in which the first clutch 4 is opened is selected. The engine start control section executes a control to transition the second clutch 5 to a slip engagement, beginning engagement of the first clutch 4 when slippage of the second clutch 5 is determined, and starting the engine 1 using the motor (motor/generator 2) as a starter motor. The engine start control section (FIG. 11) has a CL2 slip transition control section (step S512 to step S515) configured to control the transition of the second clutch 5 to the slip engagement when the engine start control is begun based on a mode transition request resulting from an accelerator depression operation, by increasing the torque transmission capacity of the second clutch 5 according to a prescribed slope after dropping the torque transmission capacity of the second clutch 5 to a value smaller than a target drive force. As a result, when the second clutch 5 is controlled to slip engagement after the engine start control has begun, the response of the vehicle behavior (vehicle longitudinal G) with respect to an accelerator operation can be improved.

(2) The CL2 slip transition control section (step S512 to step S515) is configured to make an increase gradient of a motor torque outputted from the motor (motor/generator 2) larger than an increase gradient of the target drive force when it begins increasing the torque transmission capacity of the second clutch according to the prescribed slope (step S514). As a result, in addition to the effect explained in (1) above, the accelerator response can be improved when the second clutch 5 is put into slip engagement after the engine start control begins and the second clutch 5 can be transitioned to slip engagement earlier.

(3) The CL2 slip transition control section (step S512 to step S515) sets a drop amount used when the torque transmission capacity of the second clutch 5 is dropped to a value smaller than the target drive force such that the drop amount is smaller as the accelerator position opening or the target drive force is larger (step S512). As a result, in addition to the effects explained in (1) and (2) above, a decline of the vehicle longitudinal G occurring when the engine start control begins is suppressed to be smaller as the accelerator position opening or the target drive force is larger, and the demand for improved accelerator response apparent in the accelerator position opening or the target drive force can be satisfied.

(4) The CL2 slip transition control section (step S512 to S515) sets the increase slope of the torque transmission capacity of the second clutch 5 such that the increase slope is larger as the accelerator opening position or the target drive force is larger (step S513). As a result, in addition to the effects explained in (1)-(3) above, the larger the accelerator position opening or the target drive force is, the earlier the vehicle longitudinal G rises after the engine start control begins and the demand for improved accelerator response apparent in the accelerator position opening or the target drive force can be satisfied.

Embodiment 2

Embodiment 2 is an example in which the increase slope of the torque transmission capacity of the second clutch is set based on a difference between the target drive force or the motor torque and the torque transmission capacity of the second clutch.

The engine start control process configuration will now be explained. FIG. 16 shows the flow of the engine start control process executed by the integrated controller 20 according to Embodiment 2 during an EV→HEV mode transition request (engine start control means). The engine start control process configuration will be now explained based on FIG. 16. Since step S520 to step S522 and step S524 to S529 are steps for the same processing as step S510 to step S512 and step S514 to step S519 of FIG. 11, explanation of these steps will be omitted.

In step S523, in continuation of the drop amount of the torque transmission capacity of the second clutch 5 being set in step S522 or the CL2 slip determination condition not being satisfied in step S525, the torque capacity increase slope at which the torque transmission capacity of the second clutch 5 will be increased after being dropped when the engine start control begins is set according to a difference with respect to the target drive force or the motor torque. Control then proceeds to step S524. Here, the torque transmission capacity increase slope at which the torque transmission capacity of the second clutch 5 will be increased after being dropped is set such that the difference between the target drive force or the motor torque and the torque transmission capacity of the second clutch 5 becomes a prescribed value. That is, the torque transmission capacity increase slope is set such that the torque transmission capacity of the second clutch 5 follows the variation of the target drive force or the motor torque while maintaining a prescribed difference therewith. The prescribed difference value is set to be smaller as the accelerator position opening or the target drive force is larger. Since the power train system configuration, the control system configuration, the integrated controller configuration, the integrated control process configuration, and the integrated control process configuration are the same as in Embodiment 1, drawings and explanations of these configurations are omitted.

CL2 Slip Transition Control Action

The operational actions will now be explained. In Embodiment 1, the CL2 torque slope used during the CL2 slip transition control is set based on the accelerator position opening or the target drive force.

Conversely, in Embodiment 2, the CL2 torque slope used during the CL2 slip transition control is determined such that the torque transmission capacity follows the target drive force or the motor torque while being separated from the target drive force or the motor torque by a prescribed value. Thus, when an EV→HEV mode transition request occurs when starting into motion, the control executes the following step sequence of the flowchart shown in FIG. 16: step S520→step S522 step S523→step S524→step S525. While the CL2 slip determination condition is not satisfied in step S525, the sequence step S523→step S524→step S525 is repeated. In this way, while the CL2 slip determination condition is not satisfied in step S525, the increase slope is set by repeatedly calculating the torque transmission capacity of the second clutch 5 in step S523 to differ from the target drive force or the motor torque by a prescribed value.

In Embodiment 2, the torque capacity increase slope at which the torque transmission capacity of the second clutch 5 is increased after being dropped is set such that the difference between the target drive force or the motor torque and the torque transmission capacity of the second clutch 5 is held at a prescribed value. As indicated by the aforementioned equation (2) for calculating the CL2 slip amount, the CL2 slip amount ($\omega in - \omega out$) is set to a value corresponding to the difference between the input torque (Tin) and the CL2 engagement torque (Tcl2). Consequently, by holding the difference between the target drive force or the motor torque and the torque transmission capacity of the second clutch 5 at a prescribed value, the time required from the beginning of the CL2 slip transition control to the CL2 slip determination can be set to a fixed amount of time. Thus, the torque transmission capacity of the second clutch 5 can be raised while managing the time required for the CL2 slip transition control.

Also, the larger the accelerator position opening or the target drive force is, then the smaller the prescribed value of the difference is set to be. Since the input torque of the second clutch 5 increases as the accelerator position opening or the target drive force increases, CL2 slips more readily. Additionally, the value to which a driver can expect the vehicle longitudinal G to rise increases. Consequently, by setting the prescribed value of the difference to be smaller as the accelerator position opening or the target drive force is larger, the rise response of the vehicle longitudinal G can be made earlier and the demand for improved accelerator response can be satisfied. The other operational actions are the same as for Embodiment 1 and, thus, explanations thereof are omitted.

Effects will now be explained. Effects that can be obtained with a hybrid vehicle control device according to Embodiment 2 are listed below.

(5) The CL2 slip transition control section (step S522 to step S525) sets the increase slope of the torque transmission capacity of the second clutch 5 such that a difference between the target drive force or the motor torque and the torque transmission capacity of the second clutch 5 is maintained at a prescribed value (step S523). As a result, in addition to the effects explained in (1) to (3) above, the torque transmission capacity of the second clutch 5 can be raised while managing the time required for the CL2 slip transition control.

(6) The CL2 slip transition control section (step S522 to step S525) sets prescribed value of the difference such that the prescribed value is smaller as the accelerator position opening or the target drive force is larger (step S523). As a result, in addition to the effect explained in (5), the larger the accelerator position opening or the target drive force is, the earlier the vehicle longitudinal G rises after the engine start control begins and the demand for improved accelerator response apparent in the accelerator position opening or the target drive force can be satisfied.

Heretofore, the hybrid vehicle control device of the present invention has been explained based on Embodiment 1 and Embodiment 2. However, the specific configuration is not limited to these embodiments. Design changes and additions are permissible so long the resulting configuration does not depart from the scope of the invention as defined by the claims.

Embodiment 1 presents an example in which the CL2 slip transition control section sets the CL2 drop amount and the CL2 increase slope according to the accelerator position opening or the target drive force. Embodiment 2 presents an example in which the CL2 slip transition control section sets the CL2 increase slope such that a difference is maintained with respect to the target drive force or the motor torque. However, it is also acceptable for the CL2 slip transition control section to set the CL2 drop amount and the CL2 increase slope to predetermined fixed values. It is further acceptable for the set the CL2 drop amount and the CL2 increase slope based on such factors as an accelerator operation speed or a change rate of the target drive force.

In Embodiments 1 and 2, the CL2 slip transition control of the present invention is applied starting into motion from 0 km/h. However, the CL2 slip transition control of the present invention can be applied to a drive force request other than starting into motion, e.g., intermediate acceleration, so long as the engine start control begins based on a mode transition request resulting from an accelerator depression operation.

In Embodiment 1, the second clutch 5 is a gear selection engagement element provided in the automatic transmission 3 and is a clutch that is engaged for all of the transmission gears. However, it is acceptable for the second clutch to be a dedicated clutch that is provided independently between the motor and the automatic transmission, or a dedicated clutch that is provided independently between the automatic transmission and the drive wheel.

Embodiment 1 presents an example of the invention utilized in a rear-wheel drive hybrid vehicle having a one-motor/two-clutch type power train system with the first clutch disposed between the engine and the motor/generator. However, the present invention may also be utilized in a front-wheel drive hybrid vehicle having a one-motor/two-clutch type power train system.

The invention claimed is:
1. A hybrid vehicle control device comprising:
   an engine;
   a motor;
   a first clutch disposed in a driving force transmission path between the engine and the motor;

a second clutch disposed in a driving force transmission path between the motor and a drive wheel; and an engine start control section configured to begin an engine start control upon receiving a mode transition request to change to a hybrid vehicle mode while an electric vehicle mode is selected in which the first clutch is disengaged, the engine start control section executing a control to transition the second clutch to a slip engagement state, beginning engagement of the first clutch when slippage of the second clutch is determined, and starting the engine using the motor as a starter motor, the engine start control section having a second clutch slip transition control section configured to control the transition of the second clutch to the slip engagement state when the engine start control is begun based on a mode transition request resulting from an accelerator depression operation, by increasing a torque transmission capacity of the second clutch according to a prescribed slope after dropping the torque transmission capacity of the second clutch to a value smaller than a target drive force, the second clutch slip transition control section being further configured to make an increase rate of a motor torque outputted from the motor larger than an increase rate of the target drive force upon the second clutch slip transition control section beginning to increase the torque transmission capacity of the second clutch according to the prescribed slope.

2. The hybrid vehicle control device according to claim 1, wherein the second clutch slip transition control section is further configured to set the torque transmission capacity of the second clutch to a CL2 lower limit value at which the second clutch will not slip while the engine is stopped due to selection of the electric vehicle mode, and to raise the torque transmission capacity of the second clutch from the CL2 lower limit value in accordance with an increase of the target drive force when the accelerator depression operation begins.

3. The hybrid vehicle control device according to claim 2, wherein the second clutch slip transition control section sets a drop amount used when the torque transmission capacity of the second clutch is dropped to a value smaller than the target drive force such that the drop amount becomes smaller as the accelerator position opening or the target drive force becomes larger.

4. The hybrid vehicle control device according to claim 2, wherein the second clutch slip transition control section sets an increase in the prescribed slope of the torque transmission capacity of the second clutch such that the increase in the prescribed slope becomes larger as the accelerator opening position or the target drive force becomes larger.

5. The hybrid vehicle control device according to claim 2, wherein the second clutch slip transition control section sets an increase in the prescribed slope of the torque transmission capacity of the second clutch such that a difference between the target drive force or the motor torque and the torque transmission capacity of the second clutch is maintained at a prescribed value.

6. The hybrid vehicle control device according to claim 5, wherein the second clutch slip transition control section sets a prescribed value of the difference such that the prescribed value becomes smaller as the accelerator position opening or the target drive force becomes larger.

7. The hybrid vehicle control device according to claim 1, wherein the second clutch slip transition control section sets a drop amount used when the torque transmission capacity of the second clutch is dropped to a value smaller than the target drive force such that the drop amount becomes smaller as the accelerator position opening or the target drive force becomes larger.

8. The hybrid vehicle control device according to claim 7, wherein the second clutch slip transition control section sets an increase in the prescribed slope of the torque transmission capacity of the second clutch such that the increase in the prescribed slope becomes larger as the accelerator opening position or the target drive force becomes larger.

9. The hybrid vehicle control device according to claim 7, wherein the second clutch slip transition control section sets an increase in the prescribed slope of the torque transmission capacity of the second clutch such that a difference between the target drive force or the motor torque and the torque transmission capacity of the second clutch is maintained at a prescribed value.

10. The hybrid vehicle control device according to claim 9, wherein the second clutch slip transition control section sets a prescribed value of the difference such that the prescribed value becomes smaller as the accelerator position opening or the target drive force becomes larger.

11. The hybrid vehicle control device according to claim 1, wherein the second clutch slip transition control section sets an increase in the prescribed slope of the torque transmission capacity of the second clutch such that the increase in the prescribed slope becomes larger as the accelerator opening position or the target drive force becomes larger.

12. The hybrid vehicle control device according to claim 1, wherein the second clutch slip transition control section sets an increase in the prescribed slope of the torque transmission capacity of the second clutch such that a difference between the target drive force or the motor torque and the torque transmission capacity of the second clutch is maintained at a prescribed value.

13. The hybrid vehicle control device according to claim 12, wherein the second clutch slip transition control section sets a prescribed value of the difference such that the prescribed value becomes smaller as the accelerator position opening or the target drive force becomes larger.

* * * * *